Aug. 22, 1967   P. W. STRIPP   3,337,056
FLUID FILTER GASKETS
Filed Jan. 27, 1964
6 Sheets-Sheet 2

INVENTOR
PETER WILLIAM STRIPP
BY
Mason, Kolehmainen, Rathburn & Wyss
ATTORNEYS

Aug. 22, 1967  P. W. STRIPP  3,337,056
FLUID FILTER GASKETS

Filed Jan. 27, 1964

INVENTOR
PETER WILLIAM STRIPP
BY
Mason, Kolehmainen, Rathburn & Wyss
ATTORNEYS

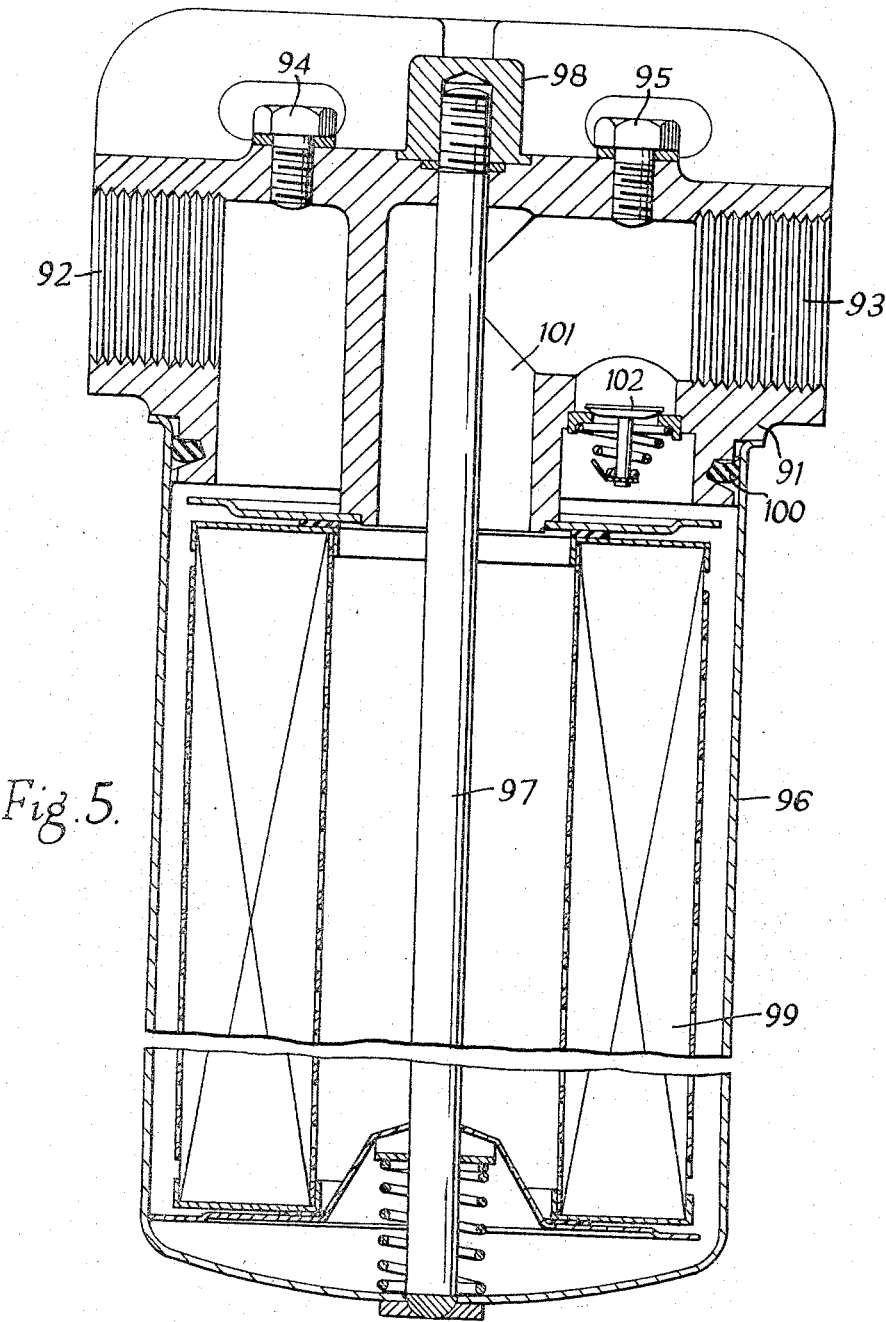

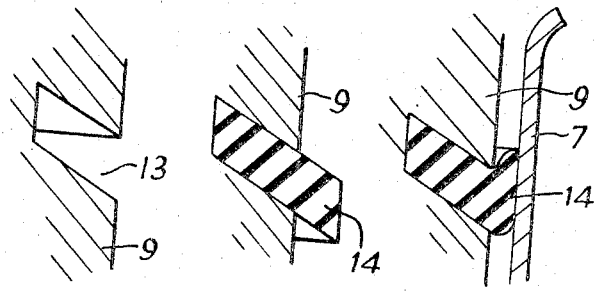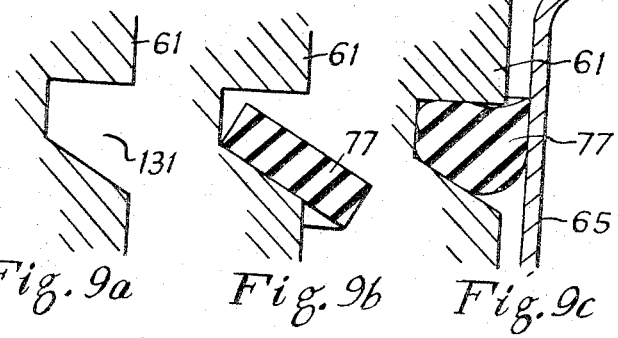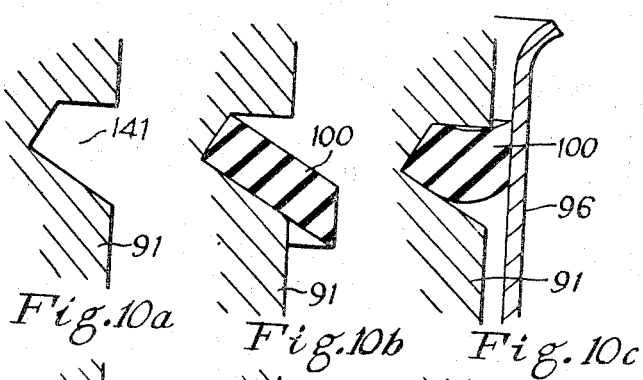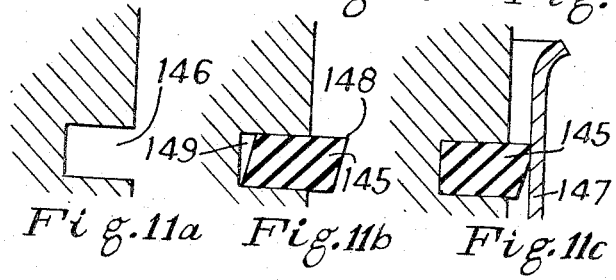

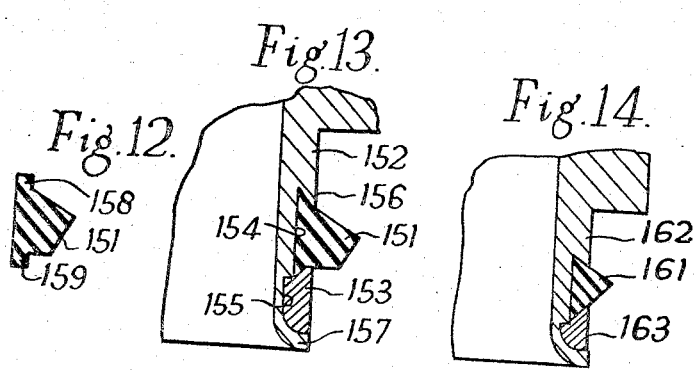
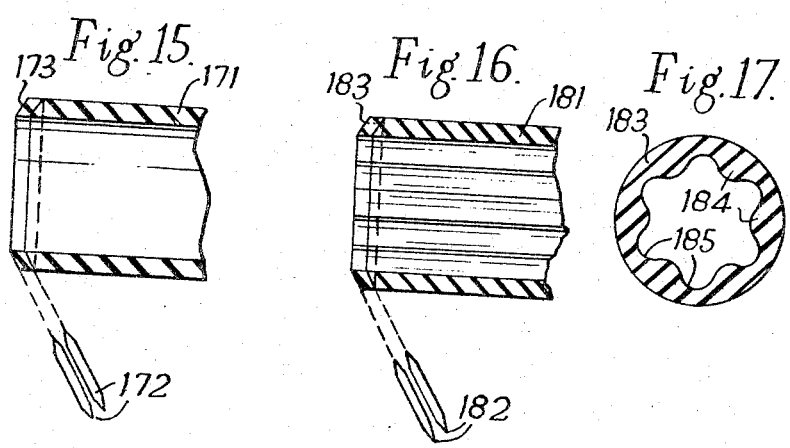

United States Patent Office 3,337,056
Patented Aug. 22, 1967

3,337,056
FLUID FILTER GASKETS
Peter William Stripp, Billacombe, Devon, England, assignor to Tecalemit (Engineering) Limited, Devon, England
Filed Jan. 27, 1964, Ser. No. 340,186
Claims priority, application Great Britain, Jan. 28, 1963, 3,404/63
8 Claims. (Cl. 210—440)

This invention relates to fluid filters and it is concerned with the provision of improvements in the construction of such filters and of parts thereof, including pressure relief valves.

A usual type of filter which is used for filtering liquids or gases, including for example oil filters for use with internal combustion engines or other machines, comprises a filter body having a removable casing or cover, these parts together forming a filter chamber in which a filter element is fitted. With such filters it is necessary that the filter body and the casing or cover should be so designed that the fluid which is being filtered and which is passing through the filter chamber, or at least a controlled-fraction thereof, should pass through the filter element, while leakage of the fluid from the system must be prevented. These requirements necessitate providing a fluid-tight seal between the filter body and the casing or cover, while still allowing the latter to be removed from the body when it is desired to clean or replace the filter element.

It is accordingly an important object of the present invention, in one of the aspects thereof, to provide improved means for forming a fluid seal between the body and cover of a fluid filter.

This may be done by providing a fluid filter comprising a body and a cover which form a filter chamber in which a filter element is fitted, wherein the body and the cover, where they engage, include parts having concentric surfaces at least one of which is substantially cylindrical and is engaged by a sealing ring made of a resilient or elastomeric material which is resiliently deformed when the cover is fitted to the casing so as to form a seal between the cover and casing.

It has been found that a fluid seal of the above type offers a number of advantages, as compared with the usual type of seal in which the act of fitting and tightening the cover compresses a sealing ring between the cover and the body of the filter. In particular, with the seal of the present invention no amount of over-tightening of the cover can damage the sealing ring, while the seal will remain effective even if the cover is not properly tightened or if it should work loose later.

A fluid filter, such as one of the kind referred to above, can be provided with a pressure relief or control valve in order to control the pressure of the fluid (usually a liquid, such as oil) being filtered, and it is a further object of the present invention to provide an improved relief valve which is suitable for this purpose.

Such a valve, according to a further feature of the invention, comprises a body having a cylinder within it, a piston operating within the cylinder, an annular valve seat at one end of the cylinder and a spring which acts on the piston within the cylinder so as to press the piston against the seat, the cylinder having at least one side port which is closed by the piston when the latter is engaging the seat but which is progressively uncovered to allow the passage of fluid when the piston is forced off its seat by fluid pressure acting on the piston.

Further features of the present invention will become apparent from the following description of a number of embodiments. Reference will be made to the accompanying drawings, in which:

FIGURE 5 is a vertical section showing yet another filter, which in this case is intended for fitting in a pipeline for filtering a fluid passing along this line;

FIGURES 8a, 8b and 8c show, in three detail sectional views, the fluid seal which is provided between the body and cover of the filter shown in FIGURE 1;

FIGURES 9a, 9b and 9c show, in three sectional views, a modified form of seal which may be used in place of the seal of FIGURES 8a, 8b and 8c and which is also shown included in the filter shown in FIGURE 4;

FIGURES 10a, 10b, and 10c show, in three sectional views, a further modified form of seal which may be used in place of the seals of FIGURES 8a, 8b, 8c, 9a, 9b and 9c and which is also shown included in the filter shown in FIGURE 5;

FIGURES 11a, 11b and 11c show, in three sectional views, yet another modified form of seal which may be used in place of those shown in the preceding figures.

FIGURES 12 and 13 show a further modified form of seal which may be used, FIGURE 12 being a sectional view of the sealing ring before fitting and FIGURE 13 being a detail sectional view showing the ring after it has been fitted to a filter body;

FIGURE 14 is a view similar to FIGURE 13 but showing another modification;

FIGURE 15 is a diagrammatic sectional view showing one method which may be used for forming sealing rings;

FIGURE 16 is a view similar to FIGURE 15 but showing the production of a sealing ring of modified section;

FIGURE 17 is a cross-section of a sealing ring produced by the method shown in FIGURE 16.

Figure 1:
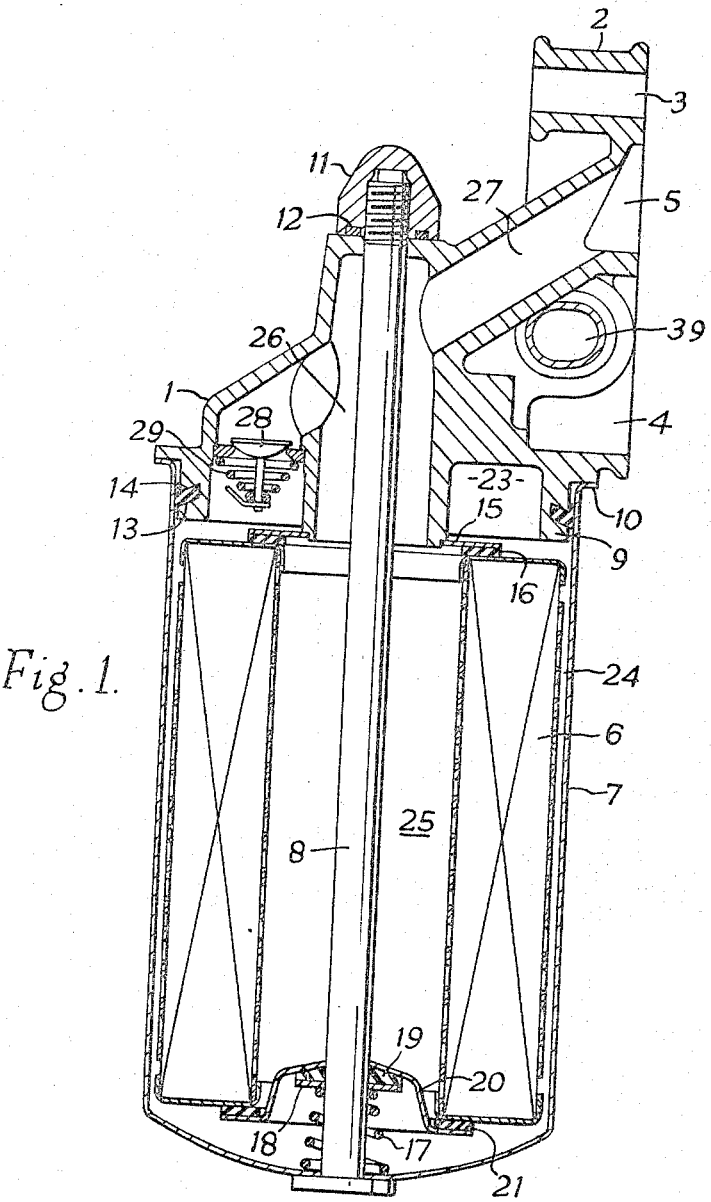
FIGURE 1 is a vertical sectional view, taken from one side, showing a filter which is designed principally for filtering lubricating oil in an internal combustion engine.
Figure 2:
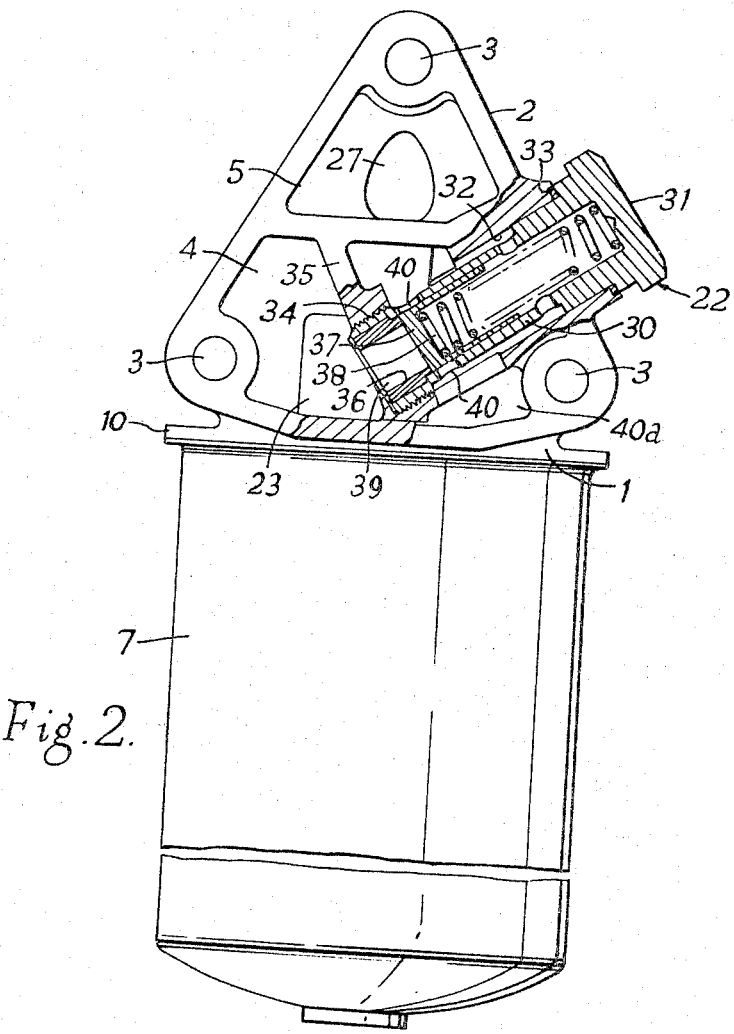
FIGURE 2 is a rear view, partly broken-away and in section, showing the filter of FIGURE 1, including particularly details of the relief valve which is fitted to this filter.

Referring first to FIGURES 1 and 2 these show a filter comprising a body 1 having a bracket part 2, the latter being formed with three holes 3 to enable the filter to be secured by bolts or studs to the side of an internal combustion engine. Oil to be filtered enters the body of the filter through an inlet 4 and is discharged back to the engine, after being filtered, through an outlet 5.

In order to accommodate the filter element 6, which may be of the pleated paper or other suitable type and which is in the form of a hollow cylinder, a casing or cover 7 is provided, which is open at one end where it is fitted to the body 1 and which is closed at its other end, except for a central hole which accommodates and which is closed by the head of a rod or bolt 8 used for holding the cover in position.

The open end of the cover 7 fits over an annular part 9 of the body 1 and its rim, which is preferably formed with an outwardly-turned flange 10 as shown, engages the body 1 in the manner shown in FIGURE 1 of the drawings. The cover 7 is secured in position by tightening a nut 11 on the threaded end of the bolt 8, it being noted that the nut 11 is preferably of the closed type and has a sealing ring 12, in order to prevent the escape of the oil being filtered.

In order to provide a seal between the body 1 and the cover 7, the part 9 of the body is formed with an annular groove 13 in which a sealing ring 14 made of synthetic rubber or other suitable resilient material is fitted, this being done in a manner which is best shown in and which will be more fully described later with reference to FIGURE 8 of the drawings.

The sealing ring 14 presses resiliently against the inner surface of the casing 7, with which it forms a fluid seal which is not affected by the tightness or looseness of the nut 11. The seal will remain effective if the nut should only be loosely tightened or if it should work loose (within limits), while even if the nut 11 should be very much over-tightened there is no risk of the sealing ring 14 being damaged as a result.

The upper end of the filter element 6 engages and forms a seal with a plate 15, which is attached to or forms a part of the body 1, using a sealing ring 16, which ring may be part of or attached to or which may be separate from the filter element 6. The element 6 is pressed upwardly by means of a spring 17 which acts on it through a washer 18, a resilient sealing ring 19, a cup member 20 and through a sealing washer 21, which latter may be attached to or form part of the filter element 6.

The filter is provided with a pressure relief or control valve 22 the construction of which will be described later.

Oil from the engine sump enters the filter head through the inlet 4 and flows through an annular chamber 23 in the body 1 into the space 24 in the casing 7 surrounding the filter element 6. Thence it passes through, and is filtered by, the element 6 and is conveyed through the central space 25 in the latter and through passages 26 and 27 in the body 1 to the outlet 5 whence it is fed to the engine bearings.

If the oil pressure obtaining within the system as a whole is greater than that pressure which is arranged for by the design of the engine, then the pressure relief valve or control valve 22 is caused to operate and to deliver the excess of oil back into the engine sump without this excess oil passing through the filter and thence to the engine bearings.

The reference 28 indicates an overload valve of mushroom type, which is fitted between the channel 23 and the passage 27. This valve is normally held closed by a spring 29 but should the filter element become clogged the valve 28 opens so that the filter element 6 is bypassed.

Referring to FIGURE 2, the relief valve 22 comprises a cylinder 30, the outer end of which is closed by a hexagonal head 31. The outer end part of the cylinder 30 forms a close fit in a bore 32 formed in the part 2 of the filter body 1, a sealing ring 33 being fitted where shown, while the inner end of the cylinder 30, which is open, is formed with a screw thread 34 which is screwed into a web 35 which also forms part of the body 1. A valve seat in the form of a sleeve or ring 36, which may be made of fibre or of any other suitable material, is fitted in the lower end of the cylinder 30, in which it may be a force fit or where it may be secured by other means.

A cup-shaped piston 37 is mounted in the cylinder 30 and is normally held against the seat 36 by a spring 38. In this position it not only closes the open end 39 of the cylinder 30 but it also covers ports 40 formed in the lower part of the cylinder.

The relief valve 22 controls the pressure of the oil in the system. The piston 38 is acted upon by the pressure of the oil which is being supplied to the filter from the engine sump by the action of the engine oil pump. When this pressure is greater than the desired value the piston 37 is forced off its seat 36 and uncovers the ports 40 by an amount which is sufficient to allow a proportion of the oil to be by-passed back to the sump through a passage 40a, the pressure in the oil system being determined by the strength of the spring 38. Oil which is not by-passed by the valve 22 passes from the channel 23 to the filter.

Figure 3:
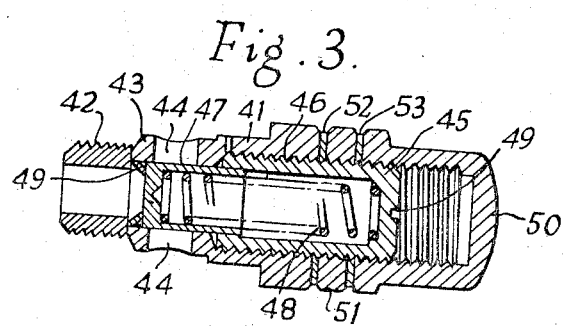
FIGURE 3 is a sectional view showing a modified form of relief valve.

Referring now to FIGURE 3, this shows a modified form of pressure relief or control valve which may be used in place of that shown in FIGURE 2.

In FIGURE 3 the valve shown comprises a body 41 having a screw threaded end 42, which corresponds to the threaded end 34 of FIGURE 2. In the construction of FIGURE 3, however, the cylinder is formed partly by a bore within the lower part 43 of the body 41, which is here formed with ports 44, corresponding to the ports 40 of FIGURE 2. The remainder of the cylinder is, however, provided by a separate externally threaded sleeve 45 which is screwed into a threaded bore 46 formed in the body 41. A piston 47 operating in the cylinder is acted upon by a spring 48 and is pressed by it against a valve seat 49. The piston 47 then covers the ports 44. The operation of the valve shown in FIGURE 3 is similar to that which has been described with reference to FIGURE 2. The action of the valve of FIGURE 3, and thus the pressure of the oil in the system can, however, be adjusted by screwing or unscrewing the sleeve 45 within the body 41, in order to increase or decrease the compression of the spring 48. For this purpose the end of the sleeve 45 is formed with a slot 49 for a screw-driver.

In FIGURE 3, 50 indicates a cap which is removed to give access to the sleeve 45, while 51 is a locking nut which is loosened when the valve is to be adjusted and which is subsequently tightened. 52 and 53 are sealing washers which are fitted as shown.

Figure 4:
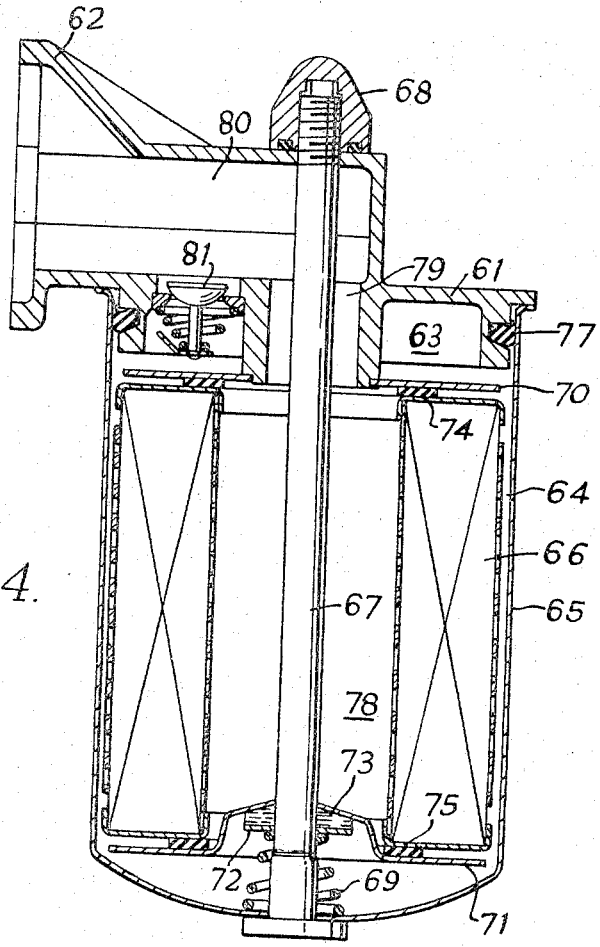
FIGURE 4 is a sectional view similar to FIGURE 1 but showing a modified filter which does not, in this case, include a relief valve.

Referring now to FIGURE 4, this shows another form of filter which can be fitted to an internal combustion engine. This filter includes sealing means for the cover which exemplify the present invention, but it does not include a pressure relief valve. Such a valve can, however, be provided if desired.

In FIGURE 4 the filter shown comprises a body 61 having a bracket part 62; this is intended to be secured by bolts or studs (not shown) to an internal combustion engine and is formed with passages for supplying oil to the filter and for delivering the oil back to the engine. The supply passage, which is not shown, communicates with a channel 63 in the body 61, which corresponds to the channel 23 of FIGURE 1, and it supplies the oil to the space 64 between the cover 65 of the filter and the filter element 66.

The cover 65 is held in place by a bolt 67 and nut 68, while the filter element 66 is held by a spring 69 between a plate 70 on the body 61 and a cup member 71, which latter is acted upon by the spring 69 through a metal washer 72 and a sealing washer 73. Sealing rings 74 and 75 are provided at the ends of the element 66 in order to form seals with the plate 70 and cup member 71, respectively, all these parts being very similar to those which have already been described and which are shown in FIGURE 1.

Furthermore, the seal between the cover 65 and an annular part of the body 61, which includes a sealing ring 77, is arranged in a similar manner to that which has been described with reference to FIGURE 1, although a modified form of sealing ring is used in the construction of FIGURE 4. This is better shown in and will be more fully described with reference to FIGURE 9.

The oil, after passing through the filter element 66, passes up the central passage 78 of the latter and is discharged from the filter through passages 79 and 80 formed in the body 61. The reference 81 indicates an overload valve corresponding to the valve 28.

FIGURE 5 shows yet another modified form of filter; this is intended to be connected in a fluid pipe line for filtering fluid passing along this line.

The filter comprises a body 91 which is formed with an inlet 92 and with an outlet 93 for the supply and delivery of the fluid being filtered. The studs shown at 94 and 95 are blanking-off studs.

The filter includes a cover 96 which is secured to the body 91 by means of a bolt 97 and nut 98. A filter element 99 is fitted within the cover in a manner which is clearly shown in the drawing and which is closely analogous to that which has been described with reference to FIGURES 1 and 4. The seal between the cover 96 and the body 91 is provided by a sealing ring 100 and the exact form of this seal will be more fully described with reference to FIGURE 10.

The oil being filtered, after passing through the element 99 of FIGURE 5, is delivered through the central passage 101 in the body 91 to the outlet 93. An overload valve similar to the valve 28 of FIGURE 1 is shown at 102.

Figures 6, 7:
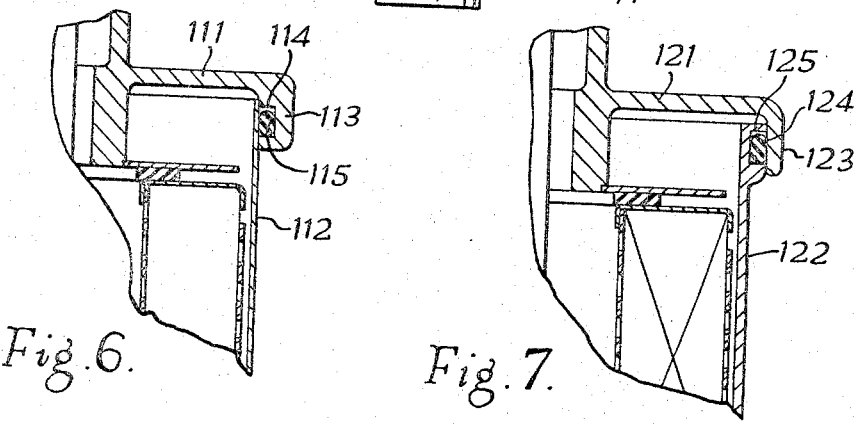
FIGURES 6 and 7 are detail sectional views showing parts of two modified constructions of filter body and filter cover which may be used in place of those shown in any of FIGURES 1, 4 and 5.

Referring now to FIGURE 6, this shows a modified method of arranging the seal between a filter body, here indicated at 111, and its cover 112. In this case the body 111 is formed with a downwardly-turned peripheral flange 113, which is formed with an internal groove or recess 114 in which a sealing ring 115 is fitted. The upper end of the cover 112 engages inside the flange 113 and compresses the sealing ring 115 in the recess 114.

The ring 115 is shown as being one which is normally of circular cross-section, although it is compressed and deformed when the cover 112 is fitted, but it would be possible to replace this seal by any one of those which are shown in FIGURES 8 to 13 of the drawings.

FIGURE 7 shows yet another modified form of engagement between a filter body 121 and a filter cover 122. In this case the body 121 is formed with a downwardly-turned peripheral flange 123 having a plane inner surface, while a sealing ring 124, corresponding to the ring 115 of FIGURE 6, is fitted in a groove or recess 125 which, in this case, is formed in the cover 122 instead of in the body flange 123. As in the case of FIGURE 6, any of the modified forms of seal shown in FIGURES 8 to 13 could be used in place of the seal shown in FIGURE 7.

Referring now to FIGURES 8a, 8b and 8c, these show in greater detail the seal which is included in the construction of FIGURE 1. The groove 13 is cut in the part 9 of the filter body at an angle and with the section shown in FIGURE 8a. The sealing ring 14, which normally has the section shown in FIGURE 8b, is fitted in this groove, but when the cover 7 is fitted the projecting edge of the ring 14 is bent over and deformed in the manner shown in FIGURE 8c. This method of arranging the sealing ring provides a very efficient seal. Furthermore, it facilitates the fitting of the cover but provides an increased hold against removal of the cover.

FIGURES 9a, 9b and 9c show the modified form of seal which is included in the filter shown in FIGURE 4. In this case the groove, here shown at 131, in the body 61 is made of trapezoidal section, as shown. The sealing ring 77 has the normal section shown in FIGURE 9b, but when the cover 65 is fitted the ring is deformed to the shape shown in FIGURE 9c.

FIGURES 10a, 10b and 10c show the seal which is included in the filter shown in FIGURE 5. It is in fact generally similar to the seal which has been described with reference to FIGURE 5 except for a difference in the cross-section of the groove 141 which is formed in the body 91 (FIGURE 10a) and for a difference in the cross-section of the sealing ring 100 (FIGURE 10b). The effect of fitting the cover 96 is shown in FIGURE 10c).

FIGURES 11a, 11b and 11c show yet another modified form of seal in which a sealing ring 145, which is normally of trapezoidal cross-section as shown in FIGURE 11b, is used in a groove 146 (FIGURE 11a) of rectangular cross-section. When a cover 147 is fitted, as shown in FIGURE 11c, it engages the projecting tip 148 of the ring 145 and presses the material of the ring into the space 149 (FIGURE 11b) which was left available in the groove 146. The ring 145 is in fact deformed into a more nearly rectangular cross-sectional shape.

FIGURE 12 shows the cross-section of another form of sealing ring 151; this is shown in FIGURE 13 fitted to a filter body 152. It is held in position on the latter by means of a holding ring 153.

Before the rings 151 and 153 are fitted the body 152 has a stepped recess including two parts 154 and 155 of different diameters, while a projecting lip 156 is provided at the upper end of the recess. The sealing ring 151 is first fitted around the part 154 of the recess, after which the ring 153 is fitted on the part 155, where it is held by swaging out the lower end of the body 152, as is shown at 157. When doing this the upper and lower lips 158 and 159 (FIGURE 12) of the sealing ring 151 are compressed and held by the lip 156 and by the ring 153, respectively.

FIGURE 14 shows yet another modification in which a sealing ring 161 of generally triangular cross-section is fitted in the upper part of a two-diameter recess formed in the lower part of a filter body 162, where it is held by a retaining ring 163 in a manner which is analogous to that which has been described with reference to FIGURE 13 and which will be clear from the drawings.

Thet sealing rings which have been described and shown in the drawings may be formed in a number of ways. The rings may, for example, be moulded individually, which may be preferred for rings of certain shapes, but in other cases it is preferred that the rings should be cut from lengths of extruded tubing. An example of this is shown diagramatically in FIGURE 15, which illustrates how a sealing ring of the cross-section shown in FIGURE 8b may be cut from a length of tube.

Such a tube, which is shown at 171, is acted upon by a cutting disc or (in the arrangement shown) a pair of discs 172, the axis of which is inclined at an appropriate angle to the axis of the tube. The cutting discs 172 are rotated in the usual way and their edges are brought against the tube 171 near its end so as to cut a sealing ring 173 of the required section from the end of the tube. This may be done by either rotating the tube 171 relatively to the cutting discs or by making the latter travel round the tube.

As shown in FIGURE 15 a pair of discs 172 may be used in order to cut accurately both the side faces of the ring 173. It would, however, be possible to use only a single cutting disc to cut a series of rings from the tube.

FIGURE 16 shows the production of a sealing ring of a modified internal shape, which is best shown in FIGURE 17. In this case extruded tubing 181 is used which is formed with internal flutes, the section of the tubing being that which is more clearly shown in FIGURE 17. As a result the sealing ring 183 which is cut from the tubing 181 by the cutting discs 182 will have internal projections 184 separated by grooves or recesses 185. It is these projections 184 which will engage the bottom of the groove, such as the groove 13 of FIGURE 8, in which the ring 183 is fitted, the depressions 185 in the ring providing air spaces in the bottom of the groove into which the material of the ring can be deformed when the cover is fitted and presses inwardly on the material of the sealing ring.

Similar internal projections and depressions can be formed in sealing rings having cross-sections which are different from that shown in FIGURES 8b and 16, particularly in cases in which the material of the ring would otherwise form a close fit in the groove in which it is fitted before the fitting of the cover.

I claim:

1. A fluid filter comprising a telescopically interengaging body and cover which together define a filter chamber, a frustoconical sealing ring made of an elastomeric material between said body and said cover, and a filter element fitted within said filter chamber, wherein the said body and cover, where they engage in telescopic overlapping relationship, include parts having concentric surfaces at least one of which surfaces is substantially cylindrical and is engaged by said sealing ring, which ring is resiliently deformed between said cover and said casing so as to form a fluid seal between said cover and casing, the said sealing ring being fitted in a groove formed in a selected one of said parts so that one end of the ring is accommodated within said groove and the other end projects outwardly therefrom and points generally toward the other part when said other part is in an unassembled position, and said sealing ring, when viewed in cross section, being of flattened noncircular form, having a major axis at an acute angle to the horizontal axis of said sealing ring as a whole and one pair of opposite sides of the cross section being parallel and straight and inclined at an acute angle to the said axis.

2. A fluid filter according to claim 1, wherein the said groove and the said sealing ring are so formed that space is left between said ring and said groove into which the material of said ring is forced by the fitting of the cover to said body.

3. A fluid filter according to claim 1, wherein the said sealing ring is trapezoidal in cross-section.

4. A fluid filter according to claim 1, wherein the said sealing ring is formed internally with a number of radially projecting parts which engage the bottom of said groove and which provide spaces into which the material of said ring is deformed when the cover is fitted to said body.

5. A fluid filter according to claim 1 wherein the said sealing ring is quadrilateral in cross-section.

6. A fluid filter comprising a telescopically interengaging body and cover which form a filter chamber in which a filter element is fitted, wherein the body and the cover, where they engage in telescopic overlapping relationship, include parts having concentric surfaces at least one of which is substantially cylindrical and is radially engaged by a sealing ring made of a resilient material which is resiliently deformed when the cover is fitted to the casing so as to form a seal only between the overlapping portions of the cover and casing, the said sealing ring being fitted in a groove formed in one of said parts so that a part of the ring is accommodated within the groove and a part projects from it, radially engaging the other, and wherein the sealing ring is multi-sided when viewed in section, having sides which are inclined at acute angles to the axis of the ring, and include lips which are engaged under projecting portions of the part in which said ring is fixed, one of said projecting portions being provided by a separate retaining ring which is fitted to the said part.

7. A fluid filter according to claim 6 wherein the sealing ring is of substantially triangular section.

8. A fluid filter according to claim 6 wherein the sealing ring is of substantially rhombic section.

References Cited

UNITED STATES PATENTS

| | | | |
|---|---|---|---|
| 796,266 | 8/1905 | Sutton | 210—450 |
| 2,070,039 | 2/1937 | Briggs | 210—130 X |
| 2,622,737 | 12/1952 | Balley | 210—541 |
| 2,630,228 | 3/1953 | Wright et al. | 210—130 X |
| 2,639,783 | 5/1953 | Kovacs | 210—130 X |
| 2,693,281 | 11/1954 | Winzen | 210—423 |
| 2,712,394 | 7/1955 | Koschatzky et al. | 220—46 X |
| 2,760,642 | 8/1956 | Wallace | 210—442 |
| 2,864,528 | 12/1958 | Henchert | 222—46 |
| 2,877,902 | 3/1959 | Chase et al. | 210—440 |
| 3,204,771 | 9/1965 | Baldwin | 210—443 |

FOREIGN PATENTS

| | | |
|---|---|---|
| 840,669 | 6/1952 | Germany. |
| 584,346 | 1/1947 | Great Britain. |
| 456,261 | 3/1950 | Italy. |

REUBEN FRIEDMAN, *Primary Examiner.*

F. SPEAR, *Assistant Examiner.*